Aug. 1, 1950

G. H. SHEFFIELD 2,517,038

DEVICE FOR MEASURING MECHANICAL FORCES
IN TERMS OF A FLUID PRESSURE

Filed Dec. 19, 1946

George H. Sheffield. INVENTOR.

BY J. G. McKean
Attorney

Patented Aug. 1, 1950

2,517,038

UNITED STATES PATENT OFFICE 2,517,038

DEVICE FOR MEASURING MECHANICAL FORCES IN TERMS OF A FLUID PRESSURE

George H. Sheffield, Wooster, Tex.

Application December 19, 1946, Serial No. 717,187

3 Claims. (Cl. 73—140)

The present invention is directed to a device for measuring a mechanical force in terms of a pressure exerted on a fluid medium. More specifically, the invention relates to a device adapted to determine the viscosity of a plastic material.

It is often desired to measure with accuracy a mechanical force. Many methods have been devised for measuring mechanical forces. For example, the weight of an object may be determined by balancing the object with other objects of known weight or by converting the weight of an object into a force actuating a calibrated spring which may be used to measure the weight of the original object.

Many commercial operations involve the determination of the viscosity of a plastic material. For example, operations involving the treatment of plastic materials, such as natural rubber or synthetic polymer commonly known as synthetic rubber, often requires that the viscosity of the material handled be accurately determined. The conventional means for determining the viscosity of natural and synthetic rubbers is commonly known as a Mooney viscometer in which the shearing force exerted on the plastic material is used as a measure of its viscosity.

The Mooney viscosity of a rubber sample is determined by shearing the rubber under standard conditions at a constant rate of rotation of a rotor acting on the rubber. The resistance to shear is measured by a thrust transmitted to a horizontal shaft through a series of gears, and this thrust is made to bear against a standardized spring. The displacement of the horizontal shaft against the standardized spring is measured by means of a dial indicating gauge which indicates the Mooney viscosity of the rubber sample. This device involves metal to metal contact from the time the rubber is sheared to the time the indicating gauge is read which causes the gauge pointer to vibrate considerably. The vibration of the gauge pointer limits the accuracy of the Mooney viscometer. Other types of mechanical forces besides the above-mentioned weight of an object or shearing forces are determined inaccurately because such metal to metal contacts are inherent in the measuring mechanism. It would, therefore, be desirable to convert a mechanical force into another type of force which would eliminate vibration and metal to metal contacts in the measuring equipment and thus permit accurate determination of the mechanical force.

I have found that a mechanical force may be converted into a fluid pressure under conditions which permit accurate reading of the fluid pressure and which, by proper calibration of the fluid pressure, permit an accurate determination of the original mechanical force.

Briefly, my invention involves a means for converting a mechanical force into a longitudinal thrust. The longitudinal thrust is utilized to actuate a rotating piston confined in a cylinder under such conditions that the thrust exerted on the piston causes an axial movement of the piston. The axial movement of the piston exerts a pressure on a fluid medium confined in the cylinder under such conditions that the longitudinal thrust on the piston is brought to equilibrium with the pressure on the confined fluid medium in the cylinder. A suitable indicating device is then employed to record the pressure on the fluid medium. By calibrating the pressure exerted in the cylinder against the original mechanical force, it is possible to make a very accurate determination of the mechanical force.

I have further found that a piston actuating the fluid medium in the cylinder must be rotating continuously at the time it is subjected to axial movement within the cylinder. If the piston is not rotating at the time of the axial movement, frictional drag caused by the axial movement of the piston within the cylinder results in resistance to the movement of the piston, and it is not then possible to cause the pressure of the fluid medium within the cylinder to come to true equilibrium with the axial thrust exerted against the piston. By constantly rotating the piston during the axial movement, such frictional drag is substantially eliminated and the axial thrust and pressure quickly come to equilibrium making it possible to determine accurately the thrust in terms of a fluid pressure. This feature of my invention is especially suited for converting a shearing force exerted on a rubber sample into pressure on a fluid medium which permits the rapid and accurate determination of the viscosity of the rubber sample. Conversely, this feature of my invention makes it possible to convert an unknown pressure into a mechanical force which may be used as a means of measuring under suitable conditions an original pressure acting on a fluid medium.

It is, therefore, an object of the present invention to devise a means for accurately determining a mechanical force in terms of fluid pressure. More particularly, it is an object of the present invention to devise a means for measuring accurately the viscosity of a plastic body. A further object of the present invention is to devise a means for measuring and recording the viscosity of plastic materials such as polymers commonly known as natural and synthetic rubbers in a simple and accurate manner.

In supplying the principles of my invention to a device for measuring accurately the viscosity of a plastic body, the plastic body may be sheared under standard conditions by conventional methods, and the resistance to shear converted into a thrust transmitted to a shaft through a series of gears. The horizontal shaft has attached to its end a piston which constantly rotates with the shaft and which has an axial movement corresponding to the thrust exerted on the shaft. A cylinder embracing the piston and a fluid medium is arranged in such a manner that the piston may rotate and move in an axial direction within the cylinder to impart a pressure on the fluid confined within the cylinder. The piston and cylinder are equipped with suitable passages and ports such that a fluid may be introduced into the cylinder under desired pressure conditions. When the device is not in operation, the horizontal shaft attached to the piston is forced into a zero position permitting a maximum amount of fluid to escape from the cylinder through suitable outlet ports arranged within the cylinder and/or piston. When a shearing force is exerted on the plastic material, a longitudinal thrust actuates the horizontal shaft which forces the piston into the cylinder causing the fluid escape ports to partially close. Pressure is then built up within the cylinder to resist the movement of the rotating piston and the piston is then brought to a stop when the fluid pressure resisting the movement of the piston comes to equilibrium with the thrust exerted on the horizontal shaft. The pressure inside the cylinder at equilibrium conditions is proportional to the viscosity of the plastic material; this pressure can be measured by a pressure recorder and/or on an accurate pressure gauge. The plastic sample is usually sheared at an elevated temperature such as, for example, 212° F., and under such conditions that plasticity of the sample may show a gradual decline after being sheared for a short while. It may be desired, therefore, that the pressure exerted in the cylinder be proportional to the viscosity of the rubber sample after the latter material has been sheared for a definite period of time.

The present invention will now be described in greater detail in conjunction with the drawing in which Fig. 1 is a fragmentary view, partly in section, illustrating a conventional device for determining the viscosity or plasticity of a plastic substance;

Figure 1:
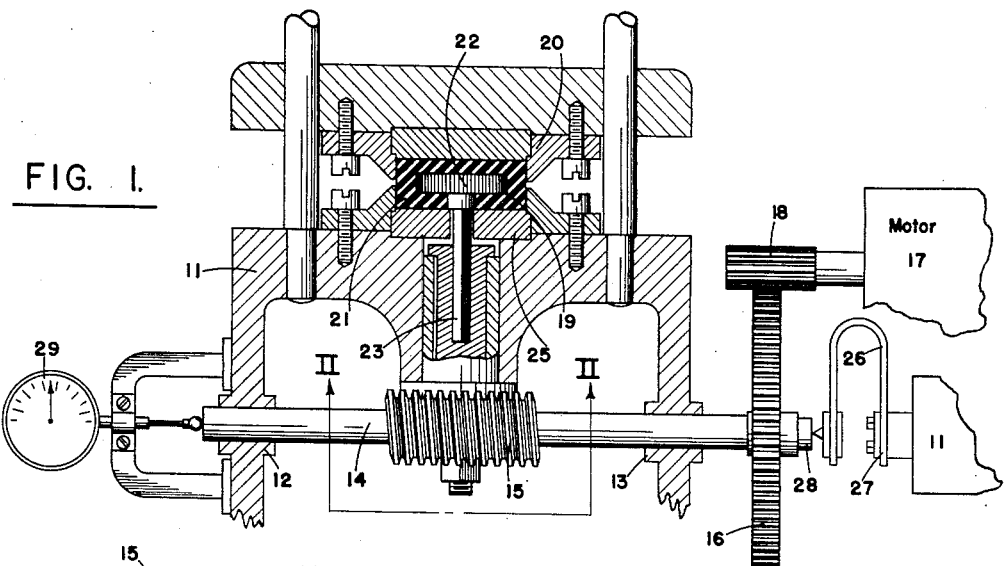
Figure 2:
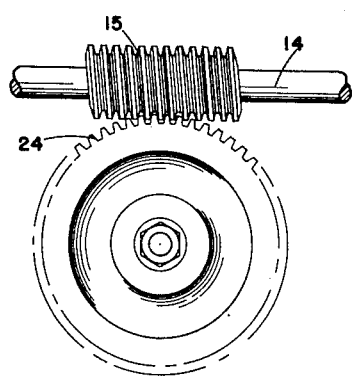
Fig. 2 is a view of a portion of Fig. 1 taken along line II—II.

Turning now specifically to Figs. 1 and 2 illustrating the apparatus conventionally used in the art, frame 11 provided with bearings 12 and 13 is arranged to carry a shaft 14 journaled thereon and free for movement along the axis of the shaft. Mounted on shaft 14 between the bearings is a worm gear 15 adapted to turn with the shaft and mounted on the shaft adjacent bearing 13 is a spur gear 16. The frame serves as a mounting means for the prime mover, such as a motor 17, arranged to drive pinion 18 which in turn drives gear 16.

Frame or housing 11 defines a sample cavity 19 which cooperates with a removable cover member 20 to define a space 21 for receiving a sample. The device is conventionally provided with releasable clamping means, not shown in the drawing, which allows a sample to be placed in space 21 for testing, and the removal of the sample after testing, and which retains cover 20 securely in position while the test is being run. Arranged for rotating within space 21 is a rotor 22 which is mounted on a shaft 23 journaled in frame 11. Gear 24 attached to shaft 23 is arranged to be driven by the action of worm gear 15. The space 21 for receiving the sample is conventionally maintained at a temperature above atmospheric; accordingly, a heating element shown generally as unit 25 is mounted on frame 11 adjacent sample cavity 21.

When no sample is within cavity 21 shaft 14 is retained in a position, hereafter designated as the initial position, by means of a U-shaped spring 26 having one end secured to the frame 11 by means of bracket 27 and the other end making contact with thrust bearing 28 which is mounted on the end of shaft 14. It will be understood that with no sample in cavity 21, rotation of the prime mover transmits rotary motion via gears 18 and 16 to shaft 14 and the motion is in turn transmitted through gears 15 and 24 and shaft 23 to rotor 22. The gear arrangement described is substantially free from friction and the drag exerted by gear 15 on gear 24 is counterbalanced by the force exerted by spring 26.

When a sample is arranged in cavity 21 for testing, as by placing a sample in the shape of an annulus below rotor 22 and a circularly shaped sample above rotor 22, a substantial drag is exerted on gear 15 and the longitudinal thrust exerted on shaft 14 overcomes the force exerted by spring 26 and moves shaft 14 longitudinally from its initial position. The longitudinal movement of shaft 14 is a function of the viscosity of the sample in sample cavity 21 and the magnitude of the movement of the shaft is displayed by an indicator, shown in the drawing as an indicator 29 mounted on frame 11 said indicator displaying the magnitude of the movement of the shaft, usually in units of one-thousandths of an inch. It will be understood that the greater the plasticity of viscosity of a sample at a given temperature, the greater the thrust exerted on shaft 14 and the greater the longitudinal movement of the shaft.

The device of the present invention may be characterized as being a null reading type of instrument; that is to say, the thrust exerted on the shaft by the plasticity of the sample is counter-balanced by imposing a thrust on the end of the shaft and determining the viscosity of the sample by the force required to counterbalance the drag exerted on the shaft due to the viscosity of the sample.

Figure 3:
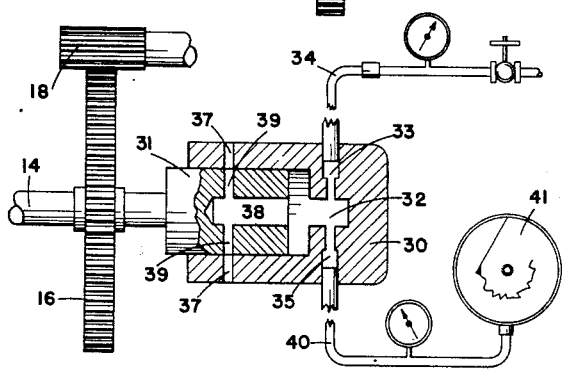
Fig. 3 is an elevation, partly in section, of a means for determining the plasticity or viscosity of a plastic substance illustrating one embodiment of the present invention.

In the embodiment of the present invention shown in Fig. 3, it will be seen that the indicator 29, spring 26, bracket 27 and thrust bearing 28 are replaced by a cylinder 30 mounted on frame 11, not shown in this figure. Slidably arranged within cylinder 30 is a piston 31 secured to the end of shaft 14 and coaxial therewith.

It will be seen that cylinder 30 defines an axial cavity 32 which is fluidly connected through radial passage 33 to an inlet line 34. Inlet line 34 is fluidly connected to a suitable means for supplying gas, not shown, to the interior of cylinder 30. Cylinder 30 defines a radially extending port 35 which connects to the cavity 32. The cylinder also defines side ports 37.

Piston 31 defines an axial passage 38 fluidly connected with radially extending ports 39. Passage 35 is connected via line 40 to a pressure recording means 41. It will be understood that means for indicating pressure in a line are well known to the art and that any suitable means either with or without means for providing a permanent record may be employed.

When utilizing the device shown in Fig. 3 a sample of polymer is placed in sample cavity 21 as conventional to the art. The pressure in line 34 is admitted so that the pressure transmitted to cylinder 30 is slightly greater than that necessary to overcome the thrust exerted by the sample. With the sample in the cavity 21 and shaft 14 rotated in a manner conventional to the art, a thrust exerted on shaft 14 will tend to move piston 31 to the end of cylinder 30. Such movement will reduce the area of the opening defined by ports 37 and 39 and increase the pressure within the cylinder until it exactly counterbalances the thrust exerted on shaft 14 by the shearing force due to the viscosity of the sample; the amount of pressure required to maintain stable conditions can be determined by observing when the conditions indicated by indicating device 41 are stable and the testing of the sample may be terminated.

Figure 4:
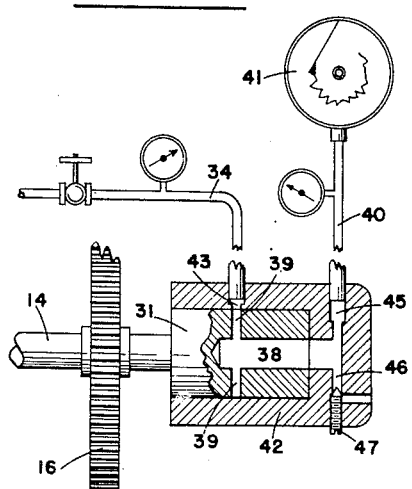
Fig. 4 is a view, partly in section, showing another embodiment of the present invention; and, Fig. 5 is an elevation, partly in section, showing still another embodiment of the present invention.

Another embodiment of the present invention is shown in Fig. 4. In this figure the parts identical with those previously described are identified by like reference numerals and will not again be described.

In the embodiment of Fig. 4, piston 31 is mounted on shaft 14. In this embodiment piston 31 is arranged for axial movement with respect to cylinder 42 mounted on frame 11, not shown in this figure. Cylinder 42 defines radially extending inlet port 43 which lies in the same plane as ports 39 of piston 31 when shaft 14 is in its initial position. The end of cylinder 42 defines passage 45 fluidly connected to line 40 and pressure indicator and recorder 41. An outlet is defined in the cylinder by passage 46 provided with needle valve 47 whereby the flow opening of the outlet passage may be adjusted at the option of the operator. It is to be understood that the usual practice in using the instrument for routine analysis will be to leave the needle valve 47 adjusted to define an orifice of constant area.

When testing a sample in the embodiment of Fig. 4 the amount of gas passed into cylinder 42 by line 34 is admitted until the pressure is greater than that necessary to overcome the thrust exerted by the sample. The force exerted by the compressed gas within the cylinder moves piston 31 away from the cylinder and the relative movement between passages 39 and inlet port 43 reduces the effective area of flow of the inlet port. The gas within the cylinder is bled off through needle valve 47 and, accordingly, piston 31 reaches a position of equilibrium; the conditions of equilibrium are indicated by a substantially constant reading of instrument 41 and the testing of the sample in the device may be terminated as desired.

Figure 5:
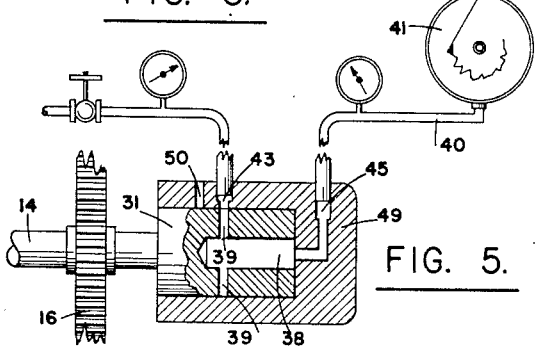

Another embodiment of the present invention is shown in Fig. 5. In this embodiment piston 31 is mounted on shaft 14 as in the embodiment of Figs. 3 and 4. A cylinder 49 defines a radially extending inlet port 43 and a radially extending outlet port 50 with the outlet port farther away from the end of the cylinder than the inlet port. An axially extending passage 38 communicating with radially extending passage 45 connects the interior of the cylinder to line 40 and pressure indicating device 41.

In the utilization of the device of Fig. 5, a sample is placed in sample cavity 21 as before and piston 31 is in a first position in which outlet port 50 is aligned with piston port 39. A shearing force is exerted on the plastic sample in the manner previously described and the shearing force in turn exerts a longitudinal thrust on shaft 14 which causes piston 31 to go to the right until piston port 39 aligns itself with gas inlet port 43. Gas is thus permitted to enter the cylinder until the thrust exerted on shaft 14 and the pressure within the cylinder tend to equilibrate which causes piston 31 to move to the left to a neutral third position in which piston port 39 is at a point between ports 43 and 50. If the thrust exerted on shaft 14 is reduced as a result of any decrease in the shearing force exerted on the sample, piston 31 will tend to move to a position which will permit communication of ports 39 and 50. Gas will escape from the cylinder until the thrust on shaft 14 overcomes the pressure within the cylinder and tends to move to the right. The piston will finally reach a third position neutral with respect to outlet ports 43 and 50 such that the pressure in the cylinder is at equilibrium with the thrust on the shaft attached to the cylinder. The pressure within cylinder 49, at equilibrium conditions, is indicated by pressure indicating device 41.

While I have disclosed specific embodiments of the present invention, it will be understood by workmen skilled in the art that various changes in the shapes, sizes, and proportions of the device may be varied substantially without departing from the scope of my invention. Although I mention the use of gas such as air as the fluid medium to be employed in the cylinder, it will be obvious that other types of fluids may be employed. Many types of liquids would be suitable for this purpose. It is also pointed out that a bellows or diaphragm may be substituted for the piston and cylinder to obtain the desired conversion of a mechanical force into a pressure pressure on a confined fluid. It is also possible to employ arrangements of port positions or valves other than those described in conjunction with the drawing for admitting the proper amount of fluid to the cylinder or to exhaust the proper amount of fluid from the cylinder in reaching equilibrium conditions.

Having fully described and illustrated the improvements of the present invention, what I wish to claim as new and useful and to secure by Letters Patent is:

1. A device for measuring the axial thrust of a rotating shaft comprising, in combination, a piston and cylinder assembly, said piston being coaxially secured to one end of said shaft, said cylinder having a first radially extending port piercing its side wall and a second port piercing one of its walls, a source of fluid pressure connected to one of said ports, said piston having an axially extending recess in its inner end and a radially extending port communicating with said recess, said last named port communicating with said first mentioned port when the piston is in a predetermined axial and rotational position and a fluid pressure gauge connected to indicate the fluid pressure in said cylinder.

2. A device in accordance with claim 1 in which the source of fluid pressure is connected to the first port and a needle valve is arranged to control the flow area of the second port.

3. A device in accordance with claim 1 in which the source of fluid pressure is connected to the first port and in which said second port radially extends through the side wall and is spaced further away from the closed end of the cylinder than said first port.

GEORGE H. SHEFFIELD.

REFERENCES CITED

The following references are of record in the file of this patent:

UNITED STATES PATENTS

| Number | Name | Date |
|---|---|---|
| 1,437,017 | Roberts | Nov. 28, 1922 |
| 2,037,529 | Mooney | Apr. 14, 1936 |
| 2,399,404 | Summers | Apr. 30, 1946 |

FOREIGN PATENTS

| Number | Country | Date |
|---|---|---|
| 346,317 | Great Britain | Oct. 3, 1929 |